(12) United States Patent
Yu

(10) Patent No.: US 7,796,211 B2
(45) Date of Patent: Sep. 14, 2010

(54) BACKLIGHT MODULE WITH FRAME HAVING ELASTIC MEMBER AND LIQUID CRYSTAL DISPLAY DEVICE USING SAME

(75) Inventor: Chih-Chia Yu, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 454 days.

(21) Appl. No.: 11/899,184

(22) Filed: Sep. 4, 2007

(65) Prior Publication Data

US 2008/0055517 A1 Mar. 6, 2008

(30) Foreign Application Priority Data

Sep. 1, 2006 (TW) ............................. 95132364 A

(51) Int. Cl.
*G02F 1/1333* (2006.01)
*G02F 1/1335* (2006.01)

(52) U.S. Cl. ............................ 349/65; 349/58; 349/62; 349/63; 345/87; 362/633; 362/612; 362/607

(58) Field of Classification Search ............. 349/58–65; 345/87; 362/561, 607, 612, 633
See application file for complete search history.

(56) References Cited

U.S. PATENT DOCUMENTS

| | | | |
|---|---|---|---|
| 6,609,808 B2 | 8/2003 | Chen | |
| 7,192,177 B2 * | 3/2007 | Chang et al. | 362/631 |
| 7,344,294 B2 * | 3/2008 | Hsieh et al. | 362/633 |
| 2003/0164903 A1 * | 9/2003 | Saito et al. | 349/58 |
| 2003/0223020 A1 * | 12/2003 | Lee | 349/58 |
| 2005/0141244 A1 * | 6/2005 | Hamada et al. | 362/612 |
| 2006/0092665 A1 | 5/2006 | Kim et al. | |
| 2006/0291255 A1 * | 12/2006 | Tsai et al. | 362/633 |
| 2007/0002591 A1 * | 1/2007 | Chang et al. | 362/633 |

FOREIGN PATENT DOCUMENTS

| | | |
|---|---|---|
| CN | 2414444 Y | 1/2001 |
| CN | 2769946 Y | 4/2006 |

* cited by examiner

*Primary Examiner*—Julie-Huyen L Ngo
(74) *Attorney, Agent, or Firm*—Wei Te Chung

(57) ABSTRACT

An exemplary backlight module (20) includes a light guide plate (250) including a light incident surface (251), a frame (280) accommodating the light guide plate and including a side wall (281), light emitting units (270) adjacent to the light incident surface of the light guide plate, and elastic members (240). The elastic members are detachably engaged with the side wall of the frame. Each elastic member is configured to elastically urge a corresponding light emitting unit such that the light emitting unit abuts the light incident surface of the light guide plate. In other examples, each elastic member elastically urges the side wall of the frame, or elastically urges the light guide plate. A liquid crystal display device using the backlight module is also provided.

20 Claims, 12 Drawing Sheets

BACKLIGHT MODULE WITH FRAME HAVING ELASTIC MEMBER AND LIQUID CRYSTAL DISPLAY DEVICE USING SAME

FIELD OF THE INVENTION

The present invention relates to backlight modules such as those used in liquid crystal display (LCD) devices; and particularly to a backlight module that has a frame with one or more elastic members, and an LCD device including the backlight module.

BACKGROUND

LCDs are commonly used as displays for compact electronic apparatuses. This is because they not only provide good quality images with little power consumption, but also they are very thin. The liquid crystal material in an LCD device does not emit any light itself. The liquid crystal material has to be lit by a light source so as to clearly and sharply display text and images. Thus, a backlight module is generally needed for an LCD device.

Referring to FIG. 13, a conventional backlight module 10 includes a light guide plate 110, a plastic frame 120 accommodating the light guide plate 110, a circuit board 130, and a plurality of light emitting diodes (LEDs) 140 connected to the circuit board 130.

The light guide plate 110 includes a light emitting surface 111, a light incident surface 112 adjacent to the light emitting surface 111, and two side surfaces 114 both adjacent to the light incident surface 112. The side surfaces 114 are at opposite lateral sides of the light guide plate 110. A pair of ears 115 outwardly extends from each side surface 114. The plastic frame 120 includes a plurality of notches 122 corresponding to the ears 115 of the light guide plate 110, and a plurality of cutouts 124 for accommodating the LEDs 140.

When the backlight module 10 is assembled, the light guide plate 110 is received in the plastic frame 120, with the ears 115 engaging in the notches 122. The LEDs 140 are respectively received in the cutouts 124, and are thus disposed adjacent to the light incident surface 112 of the light guide plate 110.

Due to imprecision in the manufacturing process, the sizes of the cutouts 124 may not accurately match the sizes of the LEDs 140. That is, after the backlight module 10 has been assembled, small gaps are liable to exist between the LEDs 140 and the light incident surface 112 of the light guide plate 110. Furthermore, in the process of assembly or when the backlight module 10 is in use, shaking or vibration of the backlight module 10 is liable to enlarge the gaps. These gaps may cause a reduction in the emitting luminance of the light guide plate 110.

FIG. 14 is a graph showing a relationship between the above-mentioned gaps and an efficiency of the emitting luminance. The X-coordinate represents the distance between each of the LEDs 140 and the light incident surface 112 of the light guide plate 110, in millimeters (mm). The Y-coordinate represents the relative emitting luminance of the light guide plate 110. It can be seen that the greater the value of X, the lower the value of Y. That is, the greater the gaps, the lower the value of the relative emitting luminance.

What is needed, therefore, is a backlight module that can overcome the above-described deficiencies. What is also needed is an LCD device employing such a backlight module.

SUMMARY

An aspect of the invention relates to a backlight module, the backlight module includes a light guide plate including a light incident surface, a frame accommodating the light guide plate including at least one side wall, at least one light emitting unit adjacent to the light incident surface of the light guide plate, and at least one elastic member. The at least one elastic member is detachably engaged with the at least one side wall of the frame, and is configured to elastically urge at least one of the at least one light emitting unit, the at least one side wall, and the light guide plate such that the at least one light emitting unit abuts the light incident surface of the light guide plate.

Another aspect of the invention relates to a liquid crystal display device, the liquid crystal display device includes a liquid crystal panel, and a backlight module opposite to the liquid crystal panel. The backlight module includes a light guide plate including a light incident surface, a frame accommodating the light guide plate including at least one side wall, at least one light emitting unit adjacent to the light incident surface of the light guide plate, and at least one elastic member. The at least one elastic member is detachably engaged with the at least one side wall of the frame, and is configured to elastically urge at least one of the at least one light emitting unit, the at least one side wall, and the light guide plate such that the at least one light emitting unit abuts the light incident surface of the light guide plate.

Still another aspect of the invention relates to a backlight module, the backlight module includes a light guide plate including a light incident surface, a frame accommodating the light guide plate including at least one side wall, at least one light emitting unit adjacent to the light incident surface of the light guide plate, and at least one elastic member. The at least one elastic member is detachably engaged with the at least one side wall of the frame, and is configured to make at least one of the at least one light emitting unit and the light incident surface of the light guide plate to abut each other without any gaps therebetween.

Other novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments of the present invention in detail.

Figure 1:
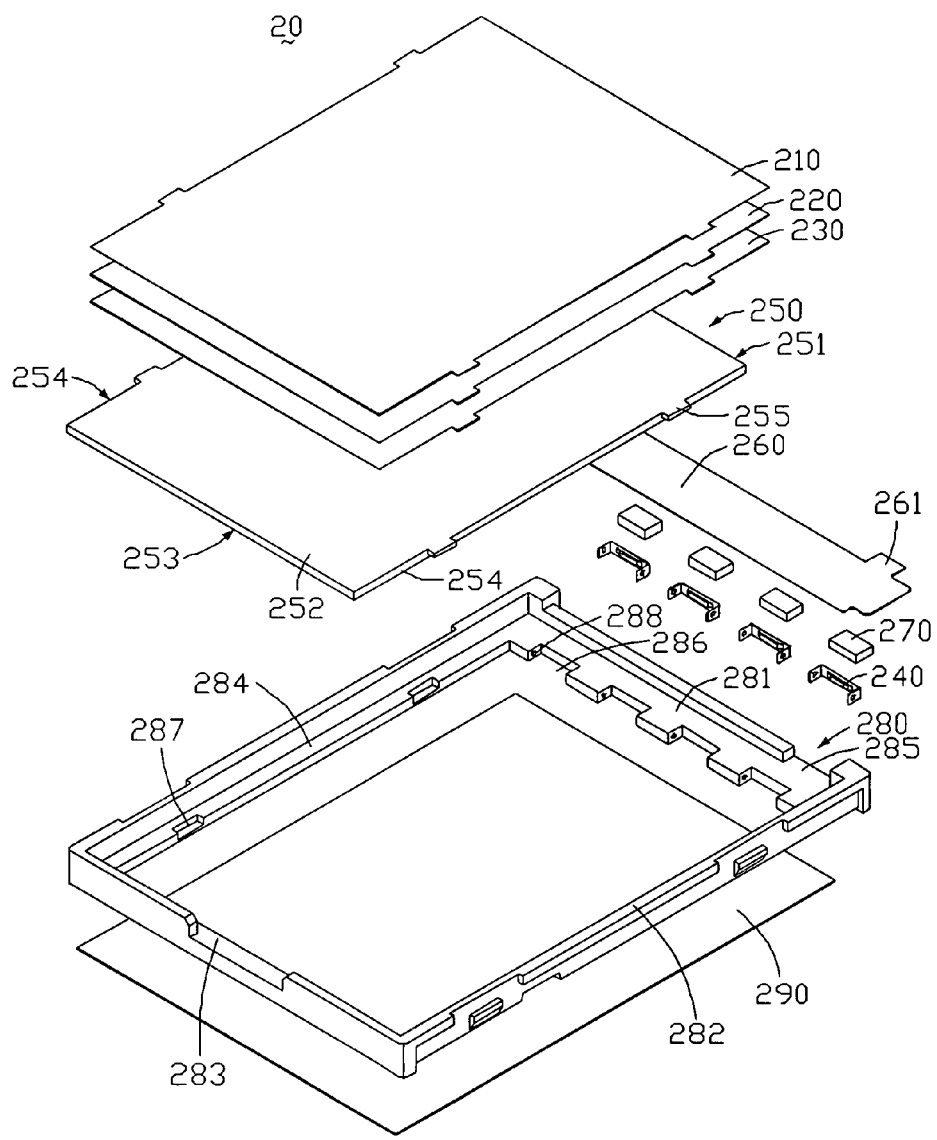
FIG. 1 is an exploded, isometric view of a backlight module according to a first embodiment of the present invention.

Referring to FIG. 1, a backlight module according to a first embodiment of the present invention is shown. The backlight module 20 includes an upper brightness enhancement film (BEF) 210, a lower BEF 220, a diffusing film 230, a plurality of elastic members 240, a light guide plate 250, a circuit board 260, a plurality of light emitting units 270, a frame 280 for accommodating the light guide plate 250, and a reflector 290. The circuit board 260 is used for providing electrical signals to the light emitting units 270. The circuit board 260 can be a flexible printed circuit board (FPCB). The light emitting units 270 can be LEDs. The light emitting units 270 are electrically connected to the circuit board 260. The light emitting units 270 may or may not be directly attached on the circuit board 260. The frame 280 can be a plastic frame.

The light guide plate 250 includes a light incident surface 251, a top light emitting surface 252 connecting to the light incident surface 251, a bottom surface 253, and two side surfaces 254 both connecting to the light incident surface 251. The side surfaces 254 are at opposite lateral sides of the light guide plate 250. A pair of ears 255 outwardly extends from each side surface 254. A thickness of the ears 255 is less than that of the light guide plate 250. A top surface of each ear 255 is coplanar with the light emitting surface 252. The circuit board 260 includes a connection strip 261.

The frame 280 includes a first side wall 281, a second side wall 282, a third side wall 283, a fourth side wall 284, and a cutout 285 in the first side wall 281. The cutout 285 is provided for the connection strip 261 to pass therethrough. The first side wall 281, the second side wall 282, the third side wall 283, and the fourth side wall 284 cooperatively form a four-sided closed structure. The first side wall 281 has a plurality of grooves 286 corresponding to the elastic members 240. Each of the grooves 286 is bounded by two opposite side walls (not labeled). Two protrusions 288 extend from the side walls respectively, toward each other. The second side wall 282 and the fourth side wall 284 each have a pair of notches 287, corresponding to the ears 255 of the light guide plate 250.

Figure 2:
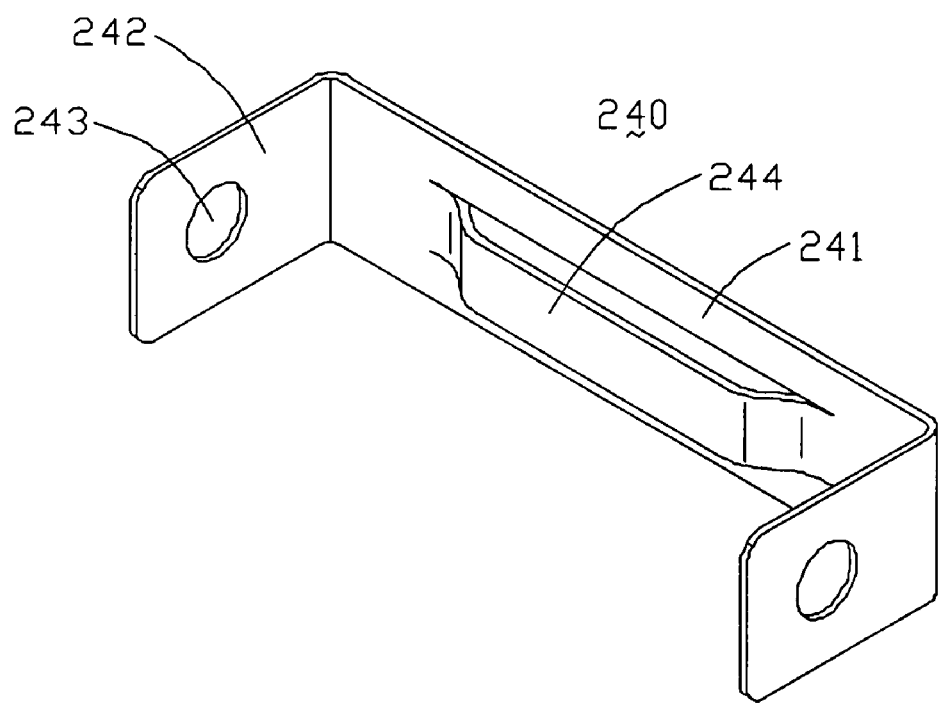
FIG. 2 is an enlarged view of an elastic member of the backlight module of FIG. 1.

Referring to FIG. 2, each elastic member 240 includes a main body 241, and two bend portions 242 vertically extending from two opposite ends of the main body 241 respectively. The two bend portions 242 are opposite to each other. Each bend portion 242 has an opening 243, with the openings 243 of the bend portions 242 being directly opposite each other. The two openings 243 correspond to the two protrusions 288 of a respective one of the grooves 286. An elastic sheet 244 is formed at a center part of the main body 241. The elastic sheet 244 protrudes from the main body 241 in the same direction along which the bend portions 242 extend from the main body 241. A main central portion (not labeled) of the elastic sheet 244 is parallel to the main body 241. The main central portion of the elastic sheet 244 connects with the main body 241 via two bent connecting portions (not labeled) of the elastic sheet 244, respectively. The elastic sheet 244 is integrally formed with or attached on the main body 241. In the illustrated embodiment, the elastic sheet 244 is integrally formed with the main body 241. This kind of elastic sheet 244 can for example be formed by a stamping procedure.

Figure 3:
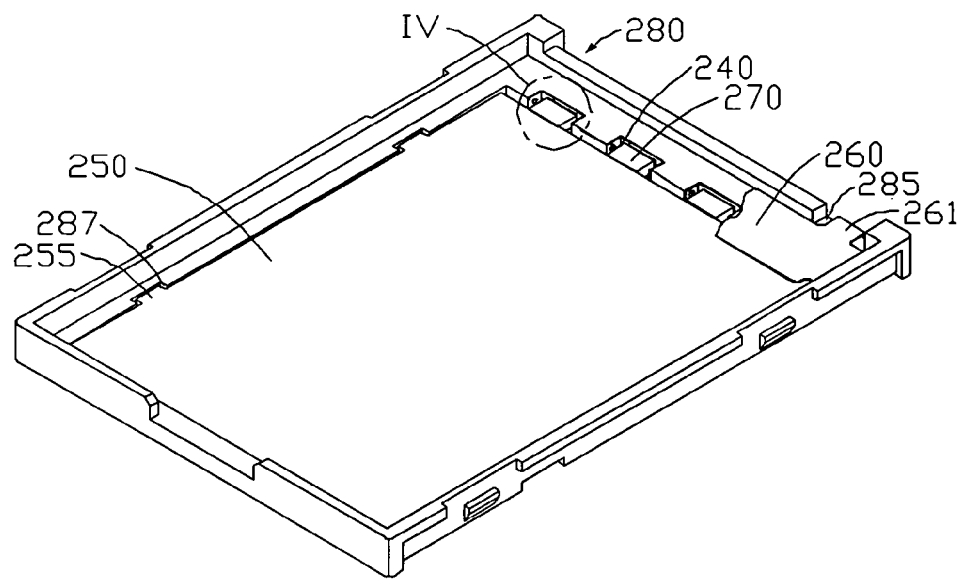
FIG. 3 is an assembled view of certain parts of the backlight module of FIG. 1.
Figure 4:
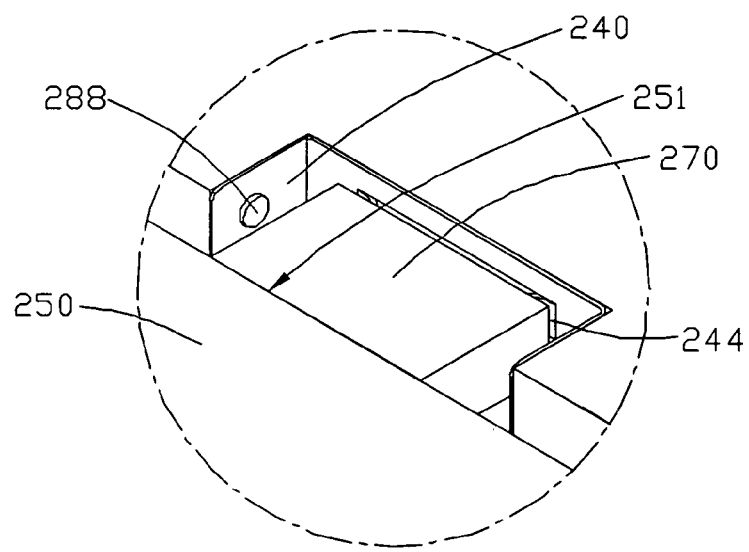
FIG. 4 is an enlarged view of a circled portion IV of FIG. 3.

Referring also to FIG. 3 and FIG. 4, when the backlight module 20 is assembled, the elastic members 240 are disposed in the grooves 286 respectively, with the openings 243 engagingly receiving the protrusions 288. The light guide plate 250 is held in the frame 280, via engaging of the ears 255 in the notches 287. The circuit board 260 is disposed on the frame 280, and the connection strip 261 extends out of the frame 280 through the cutout 285. The light emitting units 270 are fittingly received in the elastic members 240 respectively, and are pushed by the elastic sheets 244 toward the light guide plate 250. Then, the reflector 290 is disposed on the bottom surface 253 of the light guide plate 250. Finally, the diffusing film 230, the lower BEF 220, and the upper BEF 210 are arranged on the light emitting surface 252 of the light guide plate 250 in that order from bottom to top. The backlight module 20 is thus assembled.

With the above-described configurations, the elastic sheets 244 push the light emitting units 270 toward the light guide plate 250, and the light emitting units 270 are held very close to or against the light incident surface 251 of the light guide plate 250. Thereby, any gaps that would otherwise exist between the light emitting units 270 and the light incident surface 251 are reduced or even eliminated. This enables the backlight module 20 to provide improved brightness and uniformity of emitting luminance. Furthermore, the elastic members 240 can be readily detached from or installed in the frame 280, by reason of the engagement of the protrusions 288 in the openings 243.

Figure 5:
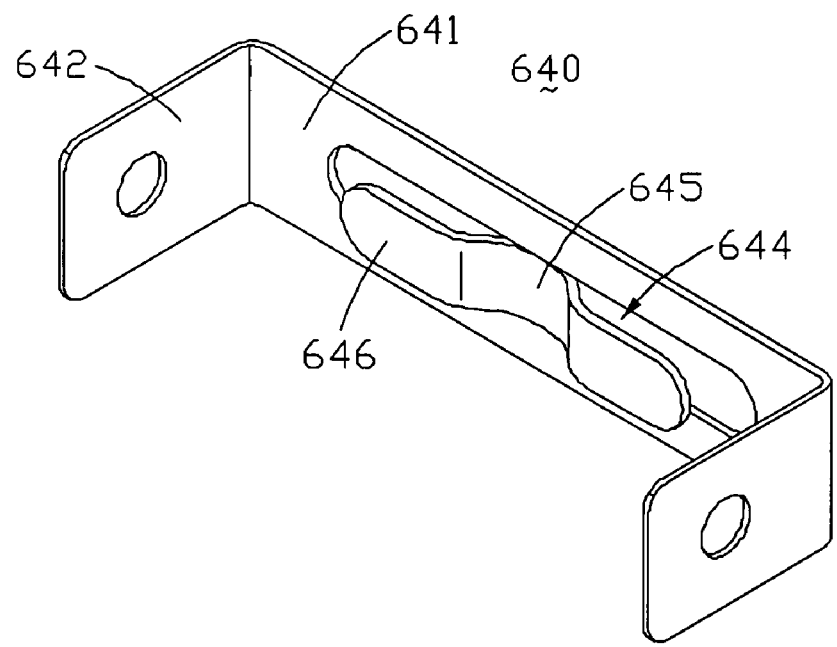
FIG. 5 is an isometric view of an elastic member of a backlight module according to a second embodiment of the present invention.

Referring to FIG. 5, an elastic member of a backlight module according to a second embodiment of the present invention is shown. The elastic member 640 is similar to the elastic member 240. However, the elastic member 640 includes a main body 641, and two bend portions 642 vertically extending from two opposite ends of the main body 641 respectively. The two bend portions 642 are opposite to each other. An elastic sheet 644 is formed at a center part of the main body 641. The elastic sheet 644 includes a connecting portion 645, and two extending portions 646 extending from two ends of the connecting portion 645 respectively. A center part of the connecting portion 645 extends from the main body 641. The two extending portions 646 are parallel to the main body 641, and extend in opposite directions toward the two bend portions 642 respectively. The elastic sheet 644 can for example be formed by a stamping procedure.

Figure 6:
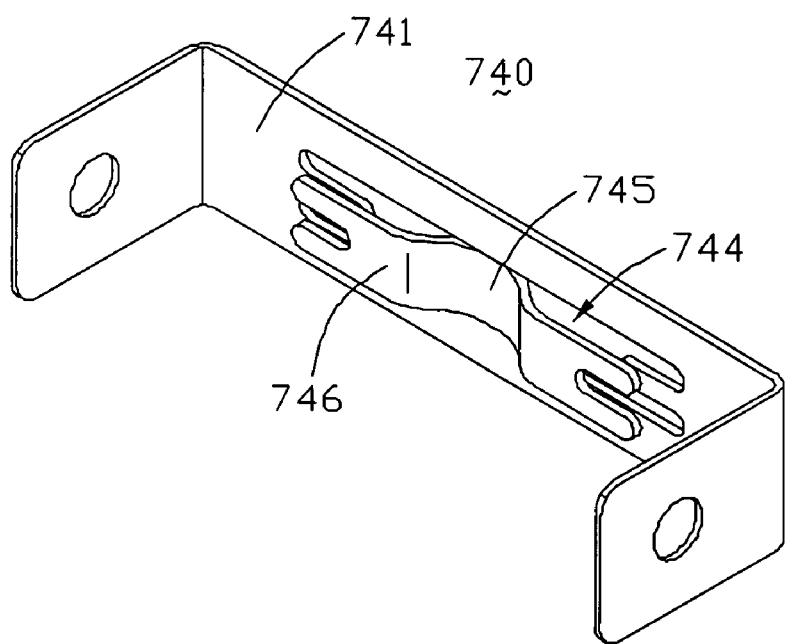
FIG. 6 is an isometric view of an elastic member of a backlight module according to a third embodiment of the present invention.

Referring to FIG. 6, an elastic member of a backlight module according to a third embodiment of the present invention is shown. The elastic member 740 is similar to the elastic member 640. However, the elastic member 740 includes a main body 741. An elastic sheet 744 is formed at a center part of the main body 741. The elastic sheet 744 includes a connecting portion 745, and two extending portions 746 extending from two ends of the connecting portion 745 respectively. A center portion of the connecting portion 745 extends from the main body 741. The two extending portions 746 are parallel to the main body 741, and extend in opposite directions toward bend portions (not labeled) of the elastic member 740 respectively. A main part of each extending portion 746 including a free end thereof is substantially U-shaped. The elastic sheet 744 can for example be formed by a stamping procedure.

Figure 7:
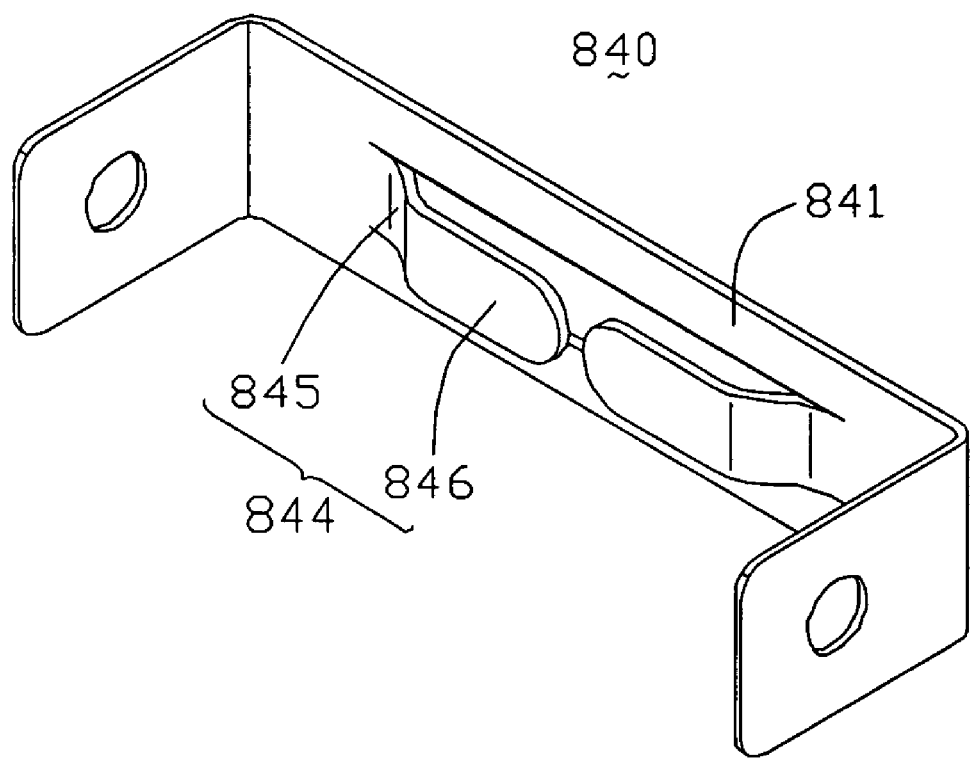
FIG. 7 is an isometric view of an elastic member of a backlight module according to a fourth embodiment of the present invention.

Referring to FIG. 7, an elastic member of a backlight module according to a fourth embodiment of the present invention is shown. The elastic member 840 is similar to the elastic member 240. However, the elastic member 840 includes a main body 841. Two elastic sheets 844 are formed at a center part of the main body 841. Each elastic sheet 844 includes a connecting portion 845 extending from the main body 841, and an extending portion 846 extending from the connecting portion 845. The two connecting portions 845 extend from two areas of the main body 841 which are at opposite sides of the main body 841 respectively. The two extending portions 846 are parallel to the main body 841, and extend in opposite directions toward each other. The elastic sheets 844 can for example be formed by a stamping procedure.

Figure 8:
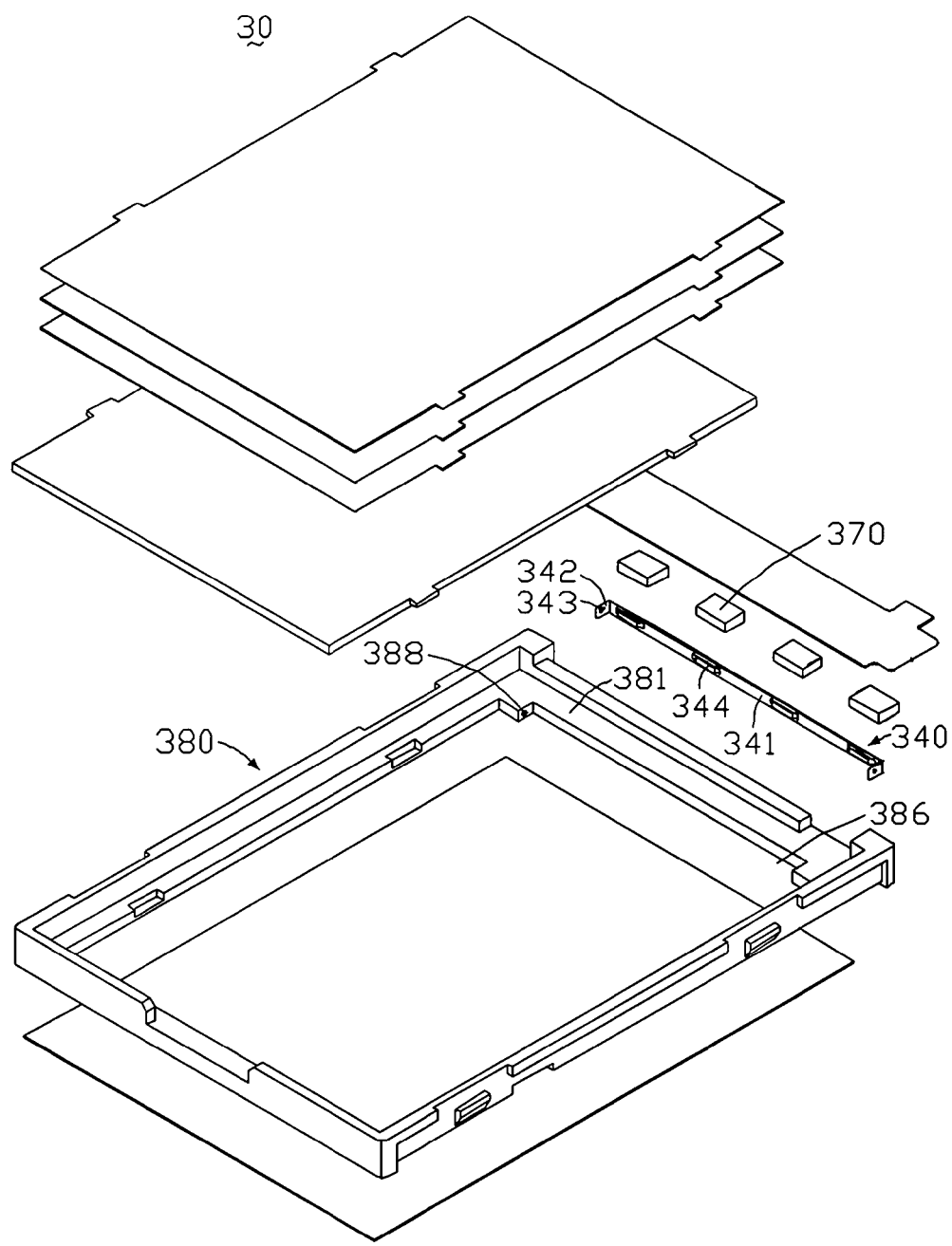
FIG. 8 is an exploded, isometric view of a backlight module according to a fifth embodiment of the present invention.

Referring to FIG. 8, a backlight module according to a fifth embodiment of the present invention is shown. The backlight module 30 is similar to the backlight module 20. However, a first side wall 381 of a frame 380 of the backlight module 30 has a single groove 386. The groove 386 is bounded by two opposite side walls (not labeled). Two protrusions 388 extend from the side walls respectively. The groove 386 is used for accommodating an elastic member 340, and a plurality of light emitting units 370 held in position by the elastic member 340.

The elastic member 340 includes an elongate main body 341, and two bend portions 342 vertically extending from two opposite ends of the main body 341 respectively. The two bend portions 342 are opposite to each other. Each bend portion 342 has an opening 343, with the openings 343 of the bend portions 342 being directly opposite each other. The two openings 343 correspond to the two protrusions 388 of the groove 386, in order to hold the elastic member 340 in the groove 386. A plurality of elastic sheets 344 is formed along the main body 341, with the elastic sheets 344 arranged at regular intervals. The elastic sheets 344 all protrude from the main body 341 in the same direction along which the bend portions 342 extend from the main body 341. Each elastic sheet 344 is configured substantially the same as the elastic sheet 244 of the above-described elastic member 240. The elastic sheets 344 can for example be formed by a stamping procedure.

In an alternative embodiment, the elastic member 340 can have only a single elastic sheet. The elastic sheet is similar to each above-described elastic sheet 344. However, the elastic sheet is much longer, so that it can push against all the light emitting units 370. The elastic sheet can for example be formed by a stamping procedure.

Figure 9:
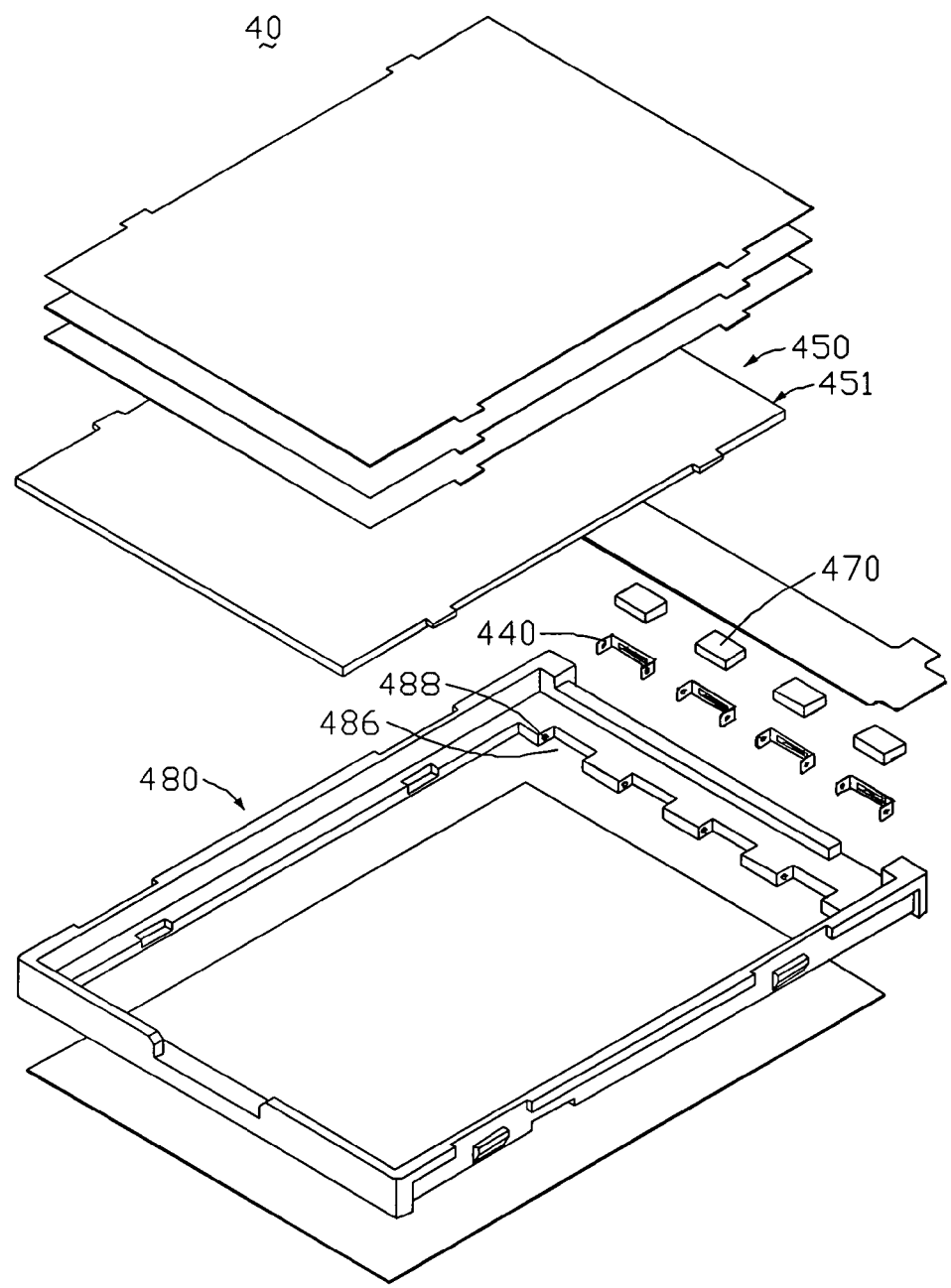
FIG. 9 is an exploded, isometric view of a backlight module according to a sixth embodiment of the present invention.
Figure 10:
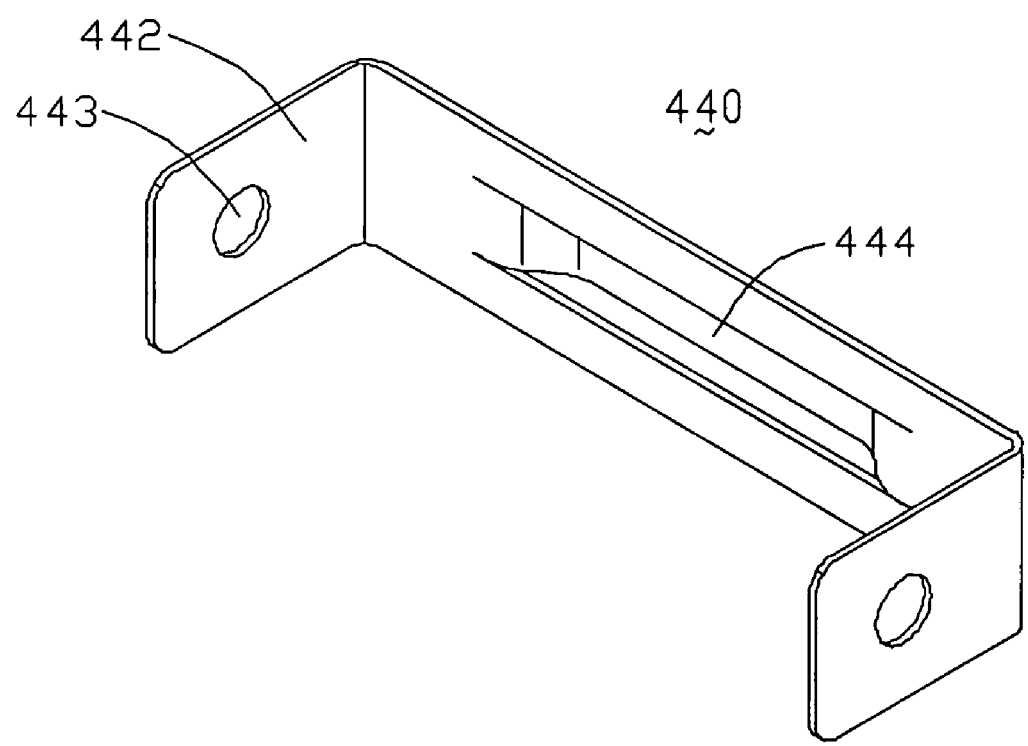
FIG. 10 is an enlarged view of an elastic member of the backlight module of FIG. 9.

Referring to FIG. 9, a backlight module according to a sixth embodiment of the present invention is shown. The backlight module 40 is similar to the backlight module 20. However, referring also to FIG. 10, an elastic member 440 of the backlight module 40 includes a main body (not labeled), two bend portions 442, and an elastic sheet 444. The elastic sheet 444 protrudes from the main body in a direction opposite to a direction along which the bend portions 442 extend from the main body. Each bend portion 442 defines an opening 443. A size of each opening 443 is slightly greater than a diameter of each protrusion 488. The elastic sheet 444 can for example be formed by a stamping procedure.

After the backlight module 40 has been assembled, a light incident surface 451 of a light guide plate 450 abuts and presses the light emitting units 470. The elastic sheet 444 of each elastic member 440 pushes against a main long inner wall that bounds the corresponding groove 486. Accordingly, a counterforce causes the main body of the elastic sheet 444 to press against a corresponding light emitting unit 470. Because the size of each opening 443 is greater than a diameter of each protrusion 488, the bend portions 442 of the elastic member 440 are able to move back and forth along short horizontal paths. Therefore a force exerted by the light incident surface 451 of the light guide plate 450 on the light emitting unit 470 is brought into equilibrium with the counterforce effectively exerted on the light emitting unit 470 by the main body of the elastic sheet 444. Thus the light emitting unit 470 is held against the light incident surface 451 of the light guide plate 450. Alternatively, each light emitting unit 470 is at least held very close to the light incident surface 451 of the light guide plate 450.

Figure 11:
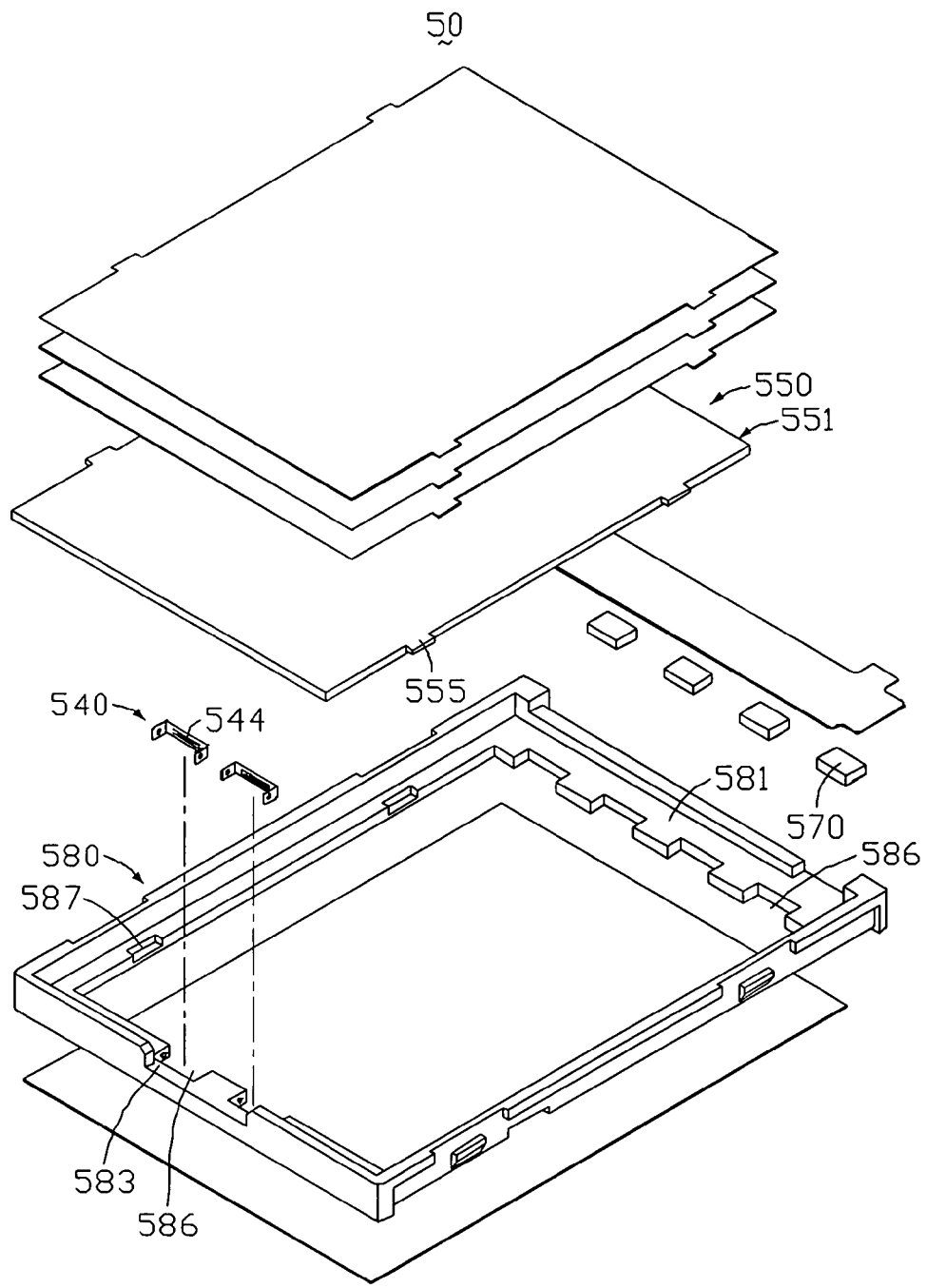
FIG. 11 is an exploded, isometric view of a backlight module according to a seventh embodiment of the present invention.

Referring to FIG. 11, a backlight module according to a seventh embodiment of the present invention is shown. The backlight module 50 is similar to the backlight module 40. However, a plurality of grooves 586 is disposed in a first and a third side walls 581, 583 of a frame 580 of the backlight module 50, respectively. The number of grooves 586 in the first side wall 581 can be different from the number of grooves 586 in the third side wall 583. The grooves 586 in the first side wall 581 are used for accommodating a plurality of light emitting units 570, and the grooves 586 in the third side wall 583 are used for accommodating a plurality of elastic members 540. A length of each of notches 587 of the frame 580 is greater than a length of each of ears 555 of a light guide plate 550.

After the backlight module 50 has been assembled, an elastic sheet 544 of each elastic member 540 pushes against the light guide plate 550. A light incident surface 551 of the light guide plate 550 abuts and presses the light emitting units 570. Each light emitting unit 570 pushes against a main long inner wall that bounds the corresponding groove 586. Accordingly, a counterforce causes the light emitting unit 570 to press against the light incident surface 551 of the light guide plate 550. Because the length of each notch 587 is greater than the length of each ear 555, the ears 555 can be move back and forth along short horizontal paths in the notches 587, and the light guide plate 550 is able to move back and forth along a short horizontal path. Therefore a force exerted by the elastic sheets 544 of the elastic members 540 on the light guide plate 550 is brought into equilibrium with the counterforce exerted on the light emitting units 570 by the main long inner walls at the grooves 586. Thus each light emitting unit 570 is held against the light incident surface 551 of the light guide plate 550. Alternatively, each light emitting unit 570 is at least held very close to the light incident surface 551 of the light guide plate 550.

Figure 12:
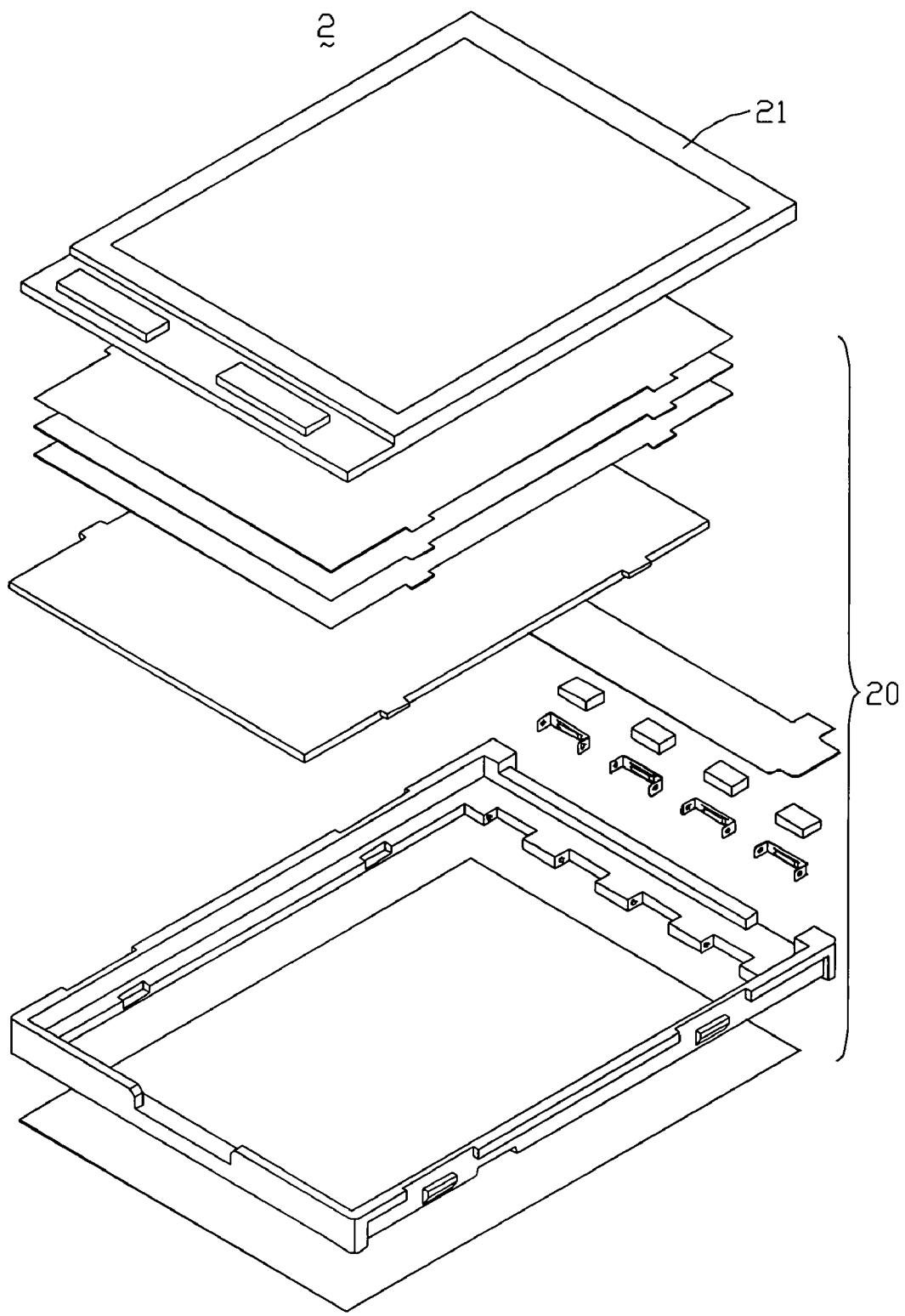
FIG. 12 is an exploded, isometric view of an LCD device according to an eighth embodiment of the present invention, the LCD device including the backlight module of FIG. 1.
Figure 13:
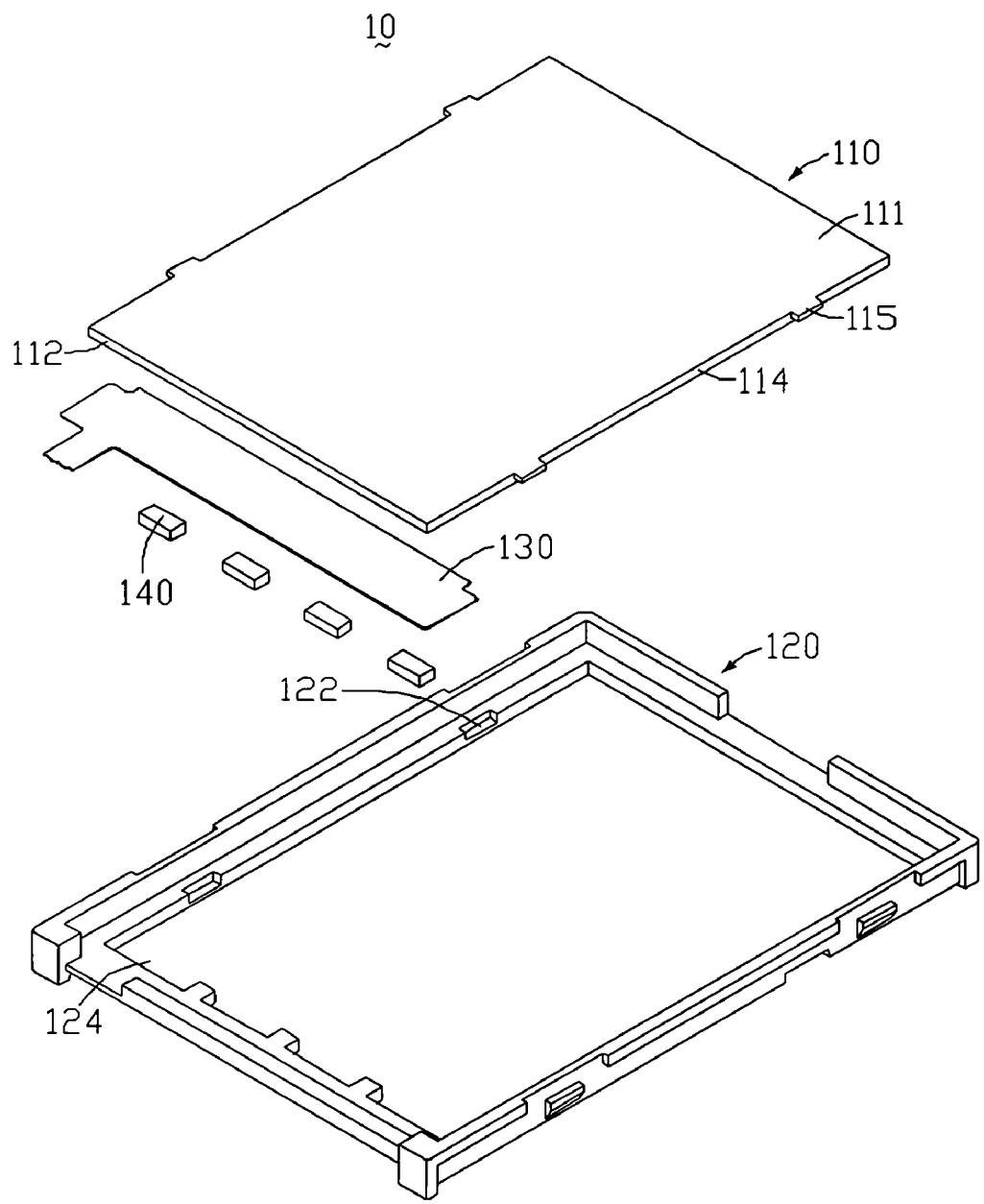
FIG. 13 is an exploded, isometric view of a conventional backlight module.
Figure 14:
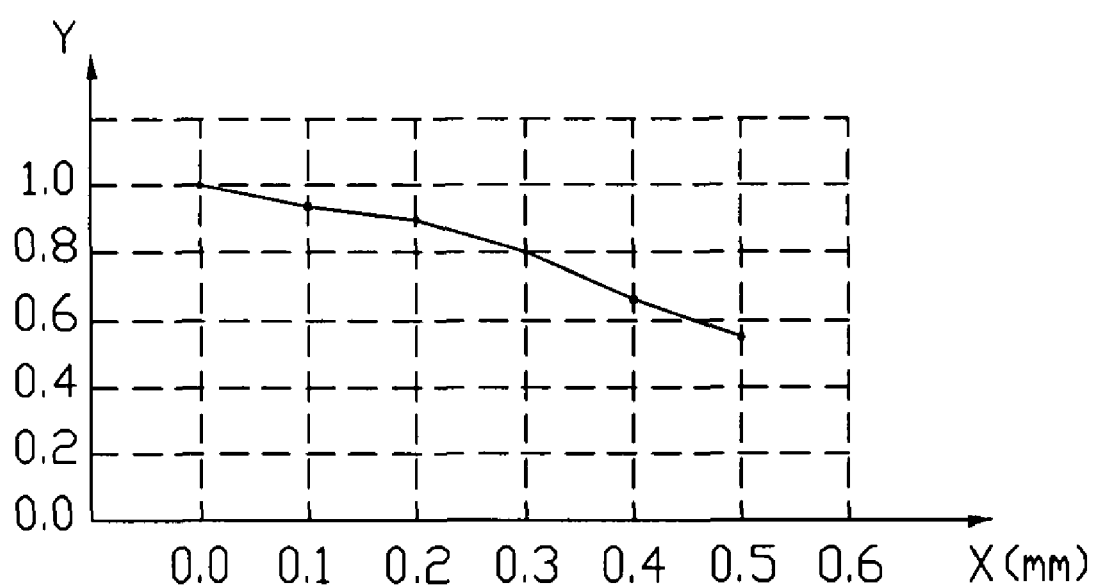
FIG. 14 is a graph relating to an emitting luminance of a light guide plate of the backlight module of FIG. 13, showing the emitting luminance varying according to a distance between each of LEDs and a light incident surface of the light guide plate.

Referring to FIG. 12, a liquid crystal display device according to an eighth embodiment of the present invention is shown. The liquid crystal display device 2 includes a liquid crystal panel 21, and the above-described backlight module

20 of the first embodiment. The liquid crystal panel 21 is positioned opposite to the upper BEF 210 of the backlight module 20.

In alternative embodiments, the liquid crystal display device 2 can instead employ any of the other above-described backlight modules of the second through seventh embodiments.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module, comprising:
   a light guide plate comprising a light incident surface;
   a frame accommodating the light guide plate, the frame comprising a side wall;
   at least one light emitting unit adjacent to the light incident surface of the light guide plate; and
   at least one elastic member;
   wherein the side wall of the frame is adjacent to the light incident surface of the light guide plate and comprises at least one groove, each respective groove accommodating one corresponding elastic member and being bounded by two opposite side walls, and two protrusions extend from the side walls of the groove toward each other, and the at least one elastic member is detachably engaged with the side wall of the frame and is configured to elastically urge the at least one light emitting unit, the side wall, and the light guide plate such that the at least one light emitting unit abuts the light incident surface of the light guide plate.

2. The backlight module as claimed in claim 1, wherein each respective elastic member comprises a main body and two bend portions vertically extending from two opposite ends of the main body respectively, and each of the bend portions has an opening defined therein.

3. The backlight module as claimed in claim 2, wherein each respective elastic member further comprises an elastic sheet disposed at a center part of the main body, and the elastic sheet protrudes from the main body in the same direction along which the bend portions extend from the main body.

4. The backlight module as claimed in claim 2, wherein each respective elastic member further comprises an elastic sheet disposed at a center part of the main body, the elastic sheet comprises a connecting portion and two extending portions respectively extending from two ends of the connecting portion, a center part of the connecting portion extends from the main body, and the two extending portions are parallel to the main body and extend, respectively, in opposite directions toward the two bend portions.

5. The backlight module as claimed in claim 4, wherein each extending portion comprises a main part comprising a free end of the extending portion, and the main part is substantially U-shaped.

6. The backlight module as claimed in claim 2, wherein each respective elastic member further comprises two elastic sheets disposed at a center part of the main body, each elastic sheet comprises a connecting portion extending from the main body, and an extending portion extending from the connecting portion, the two connecting portions extend, respectively, from two areas of the main body that are at opposite sides of the main body, and the two extending portions are parallel to the main body and extend in opposite directions toward each other.

7. The backlight module as claimed in claim 2, wherein a given elastic member further comprises a plurality of elastic sheets disposed along a length of the main body at regular intervals, and the elastic sheets all protrude from the main body in the same direction along which the bend portions extend from the main body.

8. The backlight module as claimed in claim 2, wherein each respective elastic member further comprises an elastic sheet disposed at a center part of the main body, the elastic sheet protrudes from the main body in a direction opposite to a direction along which the bend portions extend from the main body, and a size of each opening is slightly greater than a diameter of each protrusion.

9. A backlight module, comprising:
   a light guide plate comprising a light incident surface;
   a frame accommodating the light guide plate, the frame comprising a side wall;
   at least one light emitting unit adjacent to the light incident surface of the light guide plate; and
   at least one elastic member;
   wherein the side wall of the frame comprises at least one groove, each respective groove accommodating a respective elastic member, and each respective elastic member is detachably engaged with the side wall of the frame and is configured to make at least one of the at least one light emitting unit and the light incident surface of the light guide plate to abut each other without any gaps therebetween.

10. The backlight module as claimed in claim 9, wherein each respective groove is bounded by two opposite side walls, and two protrusions extend from the side walls of each respective groove toward each other.

11. The backlight module as claimed in claim 10, wherein each respective elastic member comprises a main body and two bend portions vertically extending respectively from two opposite ends of the main body, each of the bend portions has an opening defined therein, and the two protrusions of a corresponding groove are engaged in the openings of the bend portions such that the respective elastic member is held in the corresponding groove.

12. The backlight module as claimed in claim 11, wherein the side wall of the frame is adjacent to a surface of the light guide plate that is farthest from the light incident surface, each respective elastic member further comprises an elastic sheet disposed at a center part of the main body, and the elastic sheet protrudes from the main body in a direction opposite to a direction along which the bend portions extend from the main body.

13. The backlight module as claimed in claim 12, wherein the light guide plate further comprises two side surfaces both adjacent to the light incident surface, the two side surfaces are at opposite lateral sides of the light guide plate, each side surface has a pair of ears outwardly extending therefrom, the frame has a plurality of notches corresponding to the ears, a length of each of the notches is greater than a length of each of the ears, and the ears are received in the notches.

14. A liquid crystal display device, comprising:
   a liquid crystal panel; and
   a backlight module opposite to the liquid crystal panel, the backlight module comprising:
   a light guide plate comprising a light incident surface;
   a frame accommodating the light guide plate, the frame comprising a side wall;
   at least one light emitting unit adjacent to the light incident surface of the light guide plate; and
   at least one elastic member;

wherein the side wall of the frame comprises at least one groove, each respective groove accommodating a corresponding elastic member, and the corresponding elastic member is detachably engaged with the side wall of the frame and is configured to make at least one of the at least one light emitting unit and the light incident surface of the light guide plate abut each other.

15. The liquid crystal display device as claimed in claim 14, wherein each respective groove is bounded by two opposite side walls, each of the at least one elastic member comprises a main body and two bend portions vertically extending from two opposite ends of the main body, respectively, and the two bend portions are opposite to each other.

16. The liquid crystal display device as claimed in claim 15, wherein two protrusions extend from the side walls of the groove toward each other, each bend portion has an opening with the openings of the bend portions being directly opposite each other, and the two openings correspond to the two protrusions of a corresponding one of the at least one groove to hold the elastic member in the groove.

17. The liquid crystal display device as claimed in claim 16, wherein each respective elastic member further comprises an elastic sheet disposed on a center part of the main body, and the elastic sheet protrudes from the main body in the same direction along which the bend portions extend from the main body.

18. The liquid crystal display device as claimed in claim 16, wherein each respective elastic member further comprises an elastic sheet disposed at a center part of the main body, and the elastic sheet protrudes from the main body in a direction opposite to a direction along which the bend portions extend from the main body.

19. The liquid crystal display device as claimed in claim 18, wherein the side wall of the frame is adjacent to a surface of the light guide plate that is farthest from the light incident surface.

20. The liquid crystal display device as claimed in claim 17, wherein the side wall of the frame is adjacent to the light incident surface of the light guide plate.

* * * * *